United States Patent
Heer et al.

(10) Patent No.: US 8,522,598 B2
(45) Date of Patent: Sep. 3, 2013

(54) METHOD FOR CHECKING THE OPERATIONAL CAPABILITY OF A FINAL CONTROL DEVICE

(75) Inventors: Klaus-Peter Heer, Herxheim (DE); Volker Hirsch, Steinfeld (DE)

(73) Assignee: Siemens Aktiengesellschaft, München (DE)

( * ) Notice: Subject to any disclaimer, the term of this patent is extended or adjusted under 35 U.S.C. 154(b) by 673 days.

(21) Appl. No.: 12/599,707

(22) PCT Filed: May 14, 2008

(86) PCT No.: PCT/EP2008/055908
§ 371 (c)(1),
(2), (4) Date: Aug. 31, 2010

(87) PCT Pub. No.: WO2008/138949
PCT Pub. Date: Nov. 20, 2008

(65) Prior Publication Data
US 2010/0315069 A1    Dec. 16, 2010

(30) Foreign Application Priority Data
May 15, 2007 (DE) .......................... 10 2007 022 762

(51) Int. Cl.
*G01M 13/00* (2006.01)
(52) U.S. Cl.
USPC .......................................................... 73/1.72

(58) Field of Classification Search
USPC ........................................................... 73/1.72
See application file for complete search history.

(56) References Cited

U.S. PATENT DOCUMENTS

| | | | |
|---|---|---|---|
| 7,478,012 B2 * | 1/2009 | Tewes et al. .................. | 702/183 |
| 2002/0108436 A1 | 8/2002 | Albuaijan | |
| 2006/0191314 A1 | 8/2006 | Karte | |
| 2006/0219299 A1 | 10/2006 | Snowbarger | |
| 2007/0018127 A1 | 1/2007 | Seberger | |

FOREIGN PATENT DOCUMENTS
GB          2372087 A       8/2002

* cited by examiner

Primary Examiner — Hezron E Williams
Assistant Examiner — Paul West

(57) ABSTRACT

A control device with a valve adjusted by a control element is provided. A position sensor detects an actual position of the control element and an electro-pneumatic position controller generates a pneumatic control variable as a function of the actual and desired positions. The pneumatic control variable is supplied to the control drive via a magnetic valve activated by a supply voltage supplied by an instrumentation and control device. For carrying out a test of the magnetic valve, the magnetic valve is deactivated briefly. To initiate, monitor, and evaluate the test of the magnetic valve, the supply voltage is supplied to the magnetic valve via a controllable switch. The controllable switch is opened by a magnetic valve test signal generated by the instrumentation and control device. The magnetic valve test signal is supplied to the controllable switch via a limit switch which is opened when the control element reaches a specified position.

10 Claims, 1 Drawing Sheet

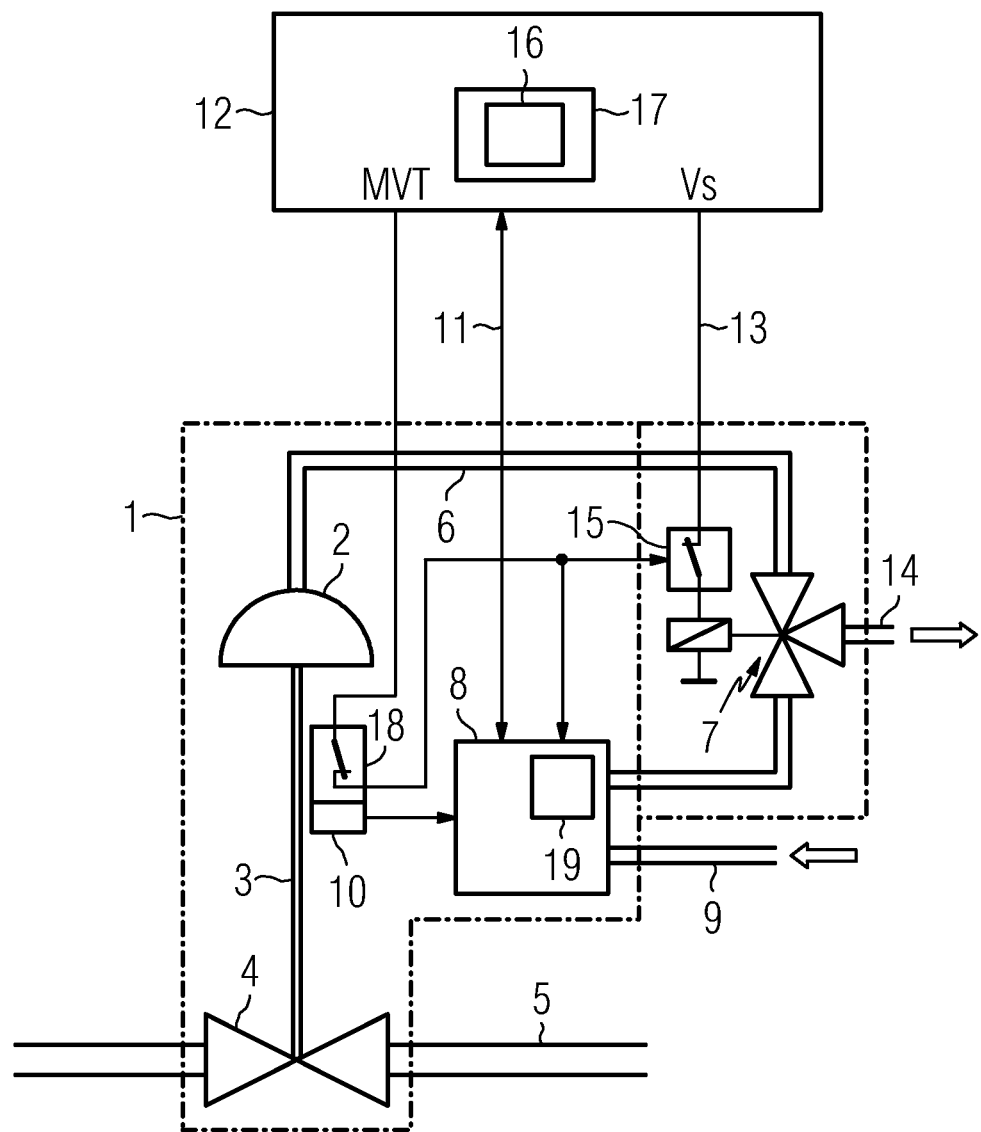

METHOD FOR CHECKING THE OPERATIONAL CAPABILITY OF A FINAL CONTROL DEVICE

CROSS REFERENCE TO RELATED APPLICATIONS

This application is the U.S. National Stage of International Application No. PCT/EP2008/055908 filed May 14, 2008, and claims the benefit thereof. The International Application claims the benefits of German Application No. 10 2007 022 762.2 DE filed May 15, 2007. All of the applications are incorporated by reference herein in their entirety.

FIELD OF INVENTION

The invention relates to a method for checking the operational capability of a final control device comprising a control valve which can be displaced via an actuating drive by means of an actuating element engaging with the control valve, a position sensor which detects the actual position of the actuating element, and an electropneumatic position controller which generates a pneumatic controlled variable as a function of the actual position and a target position, said pneumatic controlled variable being supplied to the actuating drive via an activated magnetic valve which for the purpose of its activation is supplied with a supply voltage by an instrumentation and control device and in the event of an emergency can be deactivated by switching off the supply voltage in order to vent the actuating drive, wherein in order to conduct a partial-stroke test the actuating element is briefly moved over a part of its displacement path and in the process the displacement movement is recorded, and wherein in order to conduct a magnetic valve test the magnetic valve is deactivated briefly such that the actuating element moves over only a part of its displacement path.

BACKGROUND OF INVENTION

A method of said type is known from US 2006/0219299 A1. In the case of the known method the actuating element or, as the case may be, the control valve is moved in the course of a partial-stroke test by means of the position controller from the respective current position over a part of its displacement path and is then moved back again. The change in position is so small in this case that the online operation of the plant in which the control valve is installed does not have to be interrupted and is disrupted only to an insignificant extent. During the partial-stroke test the displacement movement is recorded and stored.

In order to test the magnetic valve the latter is briefly deactivated through interruption of its voltage supply and in the process the pressure difference between the side of the magnetic valve connected to the position controller and the side connected to the actuating drive is monitored. The test of the magnetic valve is rated as successful if the pressure on the actuating drive side drops significantly during the temporary deactivation of the magnetic valve while the pressure delivered by the position controller remains largely unchanged.

SUMMARY OF INVENTION

It is desirable to be able to initiate, monitor and evaluate both the partial-stroke test and the magnetic valve test automatically by means of an instrumentation and control device disposed outside of the final control device. However, since most control valves must respond very quickly in order to be able to shut off a fluid flow in the event of an emergency, the computing cycle times of instrumentation and control devices are generally too long to allow direct control and evaluation of the execution of the magnetic valve test.

According to the invention this problem is solved in that in the case of the method described in the introduction the supply voltage is fed to the magnetic valve via a controllable switch, the controllable switch is opened for the purpose of starting the magnetic valve test by means of a magnetic valve test signal generated by the instrumentation and control device, and the magnetic valve test signal is supplied to the controllable switch via a limit switch which can be controlled by the actuating element and which is opened when the actuating element reaches a predefined position.

Although the use of a limit switch in addition to the already present position sensor in a final control device is known from US 2006/0191314 A1, the limit switch disclosed therein serves to detect the movement of the actuating element redundantly during the partial-stroke test and subsequently also to evaluate said movement redundantly; a test of the magnetic valve, on the other hand, is not provided.

In response to the magnetic valve test signal generated by the instrumentation and control device, the controllable switch interrupts the voltage supply of the magnetic valve, with the result that the latter is deactivated and consequently the actuating drive is vented. The actuating element thereupon moves as far as the predefined position; upon said position being reached the limit switch opens and interrupts the path of the magnetic valve test signal en route to the controllable switch. The controllable switch therefore closes the voltage supply again for the magnetic valve which, activated thereby, reestablishes the pneumatic connection between the position controller and the actuating drive, with the result that the movement of the actuating element is stopped and reversed. The predefined position at which the limit switch opens is chosen such that the online operation of the plant in which the control valve is installed is disrupted only to an insignificant extent by the movement of the actuating element during the test.

The advantage of the method according to the invention resides in the fact that the magnetic valve test can be carried out independently of the respective computing cycle time of the instrumentation and control device on the one hand and the response speed of the final control device on the other. The duration of the magnetic valve test signal generated by the instrumentation and control device is noncritical because in any event the movement of the actuating element is stopped and reversed when it reaches the predefined position.

Preferably the magnetic valve test signal is generated for a long enough time for the actuating element to oscillate multiple times about the predefined position. This arises owing to the fact that the actuating element is moved back again after reaching the predefined position, with the result that the limit switch closes again; the pending magnetic valve test signal is then switched through again to the controllable switch, causing the latter to open, the magnetic valve to be deactivated and the actuating element to be returned to the predefined position. This operation is repeated for as long as the magnetic valve test signal is generated, with the result that the actuating element oscillates about the predefined position. Accordingly, the position sensor records a position oscillating about the predefined position whose mean value corresponds to the predefined position and which can be transmitted via the position controller to the instrumentation and control device and stored there for logging purposes. For this, too, the respective computing cycle time of the instrumentation and control device is noncritical, because the magnetic valve test signal only has to be generated for a sufficiently long time.

The technical condition of the final control device can be inferred from the oscillating movement (frequency and amplitude) of the actuating element during the magnetic valve test. To that end the oscillating path change of the actuating element recorded by the position sensor can be evaluated or alternatively and in a particular simple manner the duty cycle of the magnetic valve test signal supplied to the controllable switch downstream of the limit switch can be recorded and evaluated. Thus, for example, the duty cycle recorded for a brand-new final control device can be stored in the position controller and used as a reference pattern for duty cycles recorded during subsequent magnetic valve tests, with the deviations from the reference pattern signaling changes in the technical condition of the final control device and where applicable a need for maintenance.

BRIEF DESCRIPTION OF THE DRAWINGS

For the purposes of further explanation of the invention reference is made in the following to the single FIGURE of the drawing, which shows an exemplary embodiment of a final control device for performing the method according to the invention.

DETAILED DESCRIPTION OF INVENTION

The final control device 1 includes a pneumatic actuating drive 2 which actuates a control valve 4 via an actuating element 3, in this case in the form of a lifting rod, and in so doing controls the fluid flow in a pipeline 5. The actuating drive 2 is connected via a pneumatic line 6 with a magnetic valve 7 disposed therein to a position controller 8 which is supplied with compressed air from a supply line 9. A position sensor 10 records the actual position of the actuating element 3 and supplies it to the position controller 8 which, as a function of the actual position and a predefinable target position, sets a variable pressure in the line 6 as a controlled variable in order to move the actuating element 3 with the valve 4 into the target position. In order to specify a target position the position controller 8 can be connected to an instrumentation and control device 12 via a communication line 11, e.g. a 4-20 mA line.

The magnetic valve 7, which can be disposed inside the final control device 1 or outside thereof, is embodied as a three-way valve and is supplied with a supply voltage Vs by the instrumentation and control device 12 via a line 13.

Under normal conditions the supply voltage Vs is switched on, such that the magnetic valve 7 is activated and pneumatically connects the position controller 8 to the actuating drive 2. In an emergency situation the instrumentation and control device 12 switches off the supply voltage Vs, with the result that the then deactivated magnetic valve 7 separates the actuating drive 2 from the position controller 8 and instead vents it via a magnetic valve outlet 14. The actuating drive 2 thereupon becomes depressurized and moves the actuating element 3 with the valve 4, assisted for example by the action of a spring in the actuating drive 2, into a safety position. In addition the deactivation and subsequent reactivation of the magnetic valve 7 can also be performed at the final control device 1 itself in that a controllable switch 15 disposed in the run of the line 13 is opened or, as the case may be, closed again.

In a partial-stroke test initiated automatically by the instrumentation and control device 12 at regular time intervals, the control valve 4 is moved briefly from the respective current position over a part of its displacement path with the magnetic valve 7 activated and is then moved back again. The change in position is so small in this case that the online operation of the plant in which the valve 4 is installed is not disrupted or is disrupted only to an insignificant extent. During each test the actual position reached by the actuating element 3 or, as the case may be, valve 4 is transmitted via the communication line 11 to the instrumentation and control device 12 and is stored and logged there in a memory 16. The partial-stroke test is rated as successful as a function of whether a predefined change in position is reached within a minimum time period or whether the change in position reaches a minimum value within a predefined time period. In this way it can be established if the control valve 4 is blocked or too slow in responding. The path changes stored during successive partial-stroke tests can be compared with one another in an evaluation device 17 of the device 12 and analyzed for the purpose of identifying change trends in order, for example, to determine the maintenance requirement.

After each partial-stroke test or every n-th partial-stroke test the operational capability of the magnetic valve 7 is tested by deactivating same. For that purpose the instrumentation and control device 12 generates a magnetic valve test signal MVT by means of which the controllable switch 15 is opened. The magnetic valve test signal MVT is supplied to the controllable switch 15 via a limit switch 18 in the final control device 1. In the home position of the actuating element 3 the limit switch 18 is closed and opens when the actuating element 3 is at a predefined position. The predefined position is reached through a small movement of the actuating element 3 of e.g. 10 to 20% of the displacement path away from the home position. The limit switch 18 can be provided separately from the position sensor 10 or structurally integrated in the position sensor 10. The controllable switch 15 can be a relay, for example, whose contacts are closed in the non-excited state and open when excited by means of the magnetic valve test signal MVT.

In response to the magnetic valve test signal MVT generated by the instrumentation and control device 12, the controllable switch interrupts the voltage supply of the magnetic valve 7, with the result that the latter is deactivated and as a consequence thereof the actuating drive 2 is vented. The actuating element 3 thereupon moves as far as the predefined position at which the limit switch 18 opens and interrupts the path of the magnetic valve test signal MVT en route to the controllable switch 15. The controllable switch 15 therefore closes the voltage supply again for the magnetic valve 7 which, activated thereby, reestablishes the pneumatic connection between the position controller 8 and the actuating drive 2, with the result that the movement of the actuating element 3 is stopped and reversed. This leads to the limit switch 18 closing again and the pending magnetic valve test signal MVT is switched through to the controllable switch 15 again, causing the latter to open, the magnetic valve 7 to be deactivated and the actuating element 3 to be returned to the predefined position. This operation is repeated for as long as the instrumentation and control device 12 generates the magnetic valve test signal MVT, causing the actuating element 3 to oscillate about the predefined position. The position recorded by the position sensor 10 during this process is transmitted via the position controller 8 to the instrumentation and control device 12 and stored there for logging purposes in the memory 16.

While the actuating element 3 oscillates about the predefined position, the position controller 8 records the magnetic valve test signal MVT between the limit switch 18 and the controllable switch 15. The position controller 8 or the instrumentation and control device 12 analyzes the duty cycle of the recorded test signal MVT. The duty cycle recorded in the factory-fresh state of the final control device 1 is stored as a reference in a memory 19 of the position controller 8 or of the device 12. During subsequent operation of the final control device 1 the duty cycle that is then recorded during a magnetic valve test is compared with the reference in order to detect changes in the technical condition of the final control device 1. This comparison and its evaluation are carried out e.g. in the evaluation device 17 of the instrumentation and control device 12.

The invention claimed is:

1. A method for checking operational capability of a final control device, comprising:
  providing a final control device, comprising:
    a control valve displaceable via an actuating drive by an actuating element engaging with the control valve,
    a position sensor detecting the actual position of the actuating element, and
    an electropneumatic position controller generating a pneumatic controlled variable as a function of the actual position and a target position;
    a magnetic valve, the pneumatic controlled variable being supplied to the actuating drive via the magnetic valve;
    an instrumentation and control device,
      the magnetic valve being supplied with a supply voltage by the instrumentation and control device, and
      the magnetic valve, in the event of an emergency, being deactivated by switching off the supply voltage in order to vent the actuating drive;
  moving briefly the actuating element over a part of a displacement path in order to conduct a partial-stroke test;
  recording the displacement movement of the actuating element;
  deactivating briefly the magnetic valve such that the actuating element moves over only a part of the displacement path in order to conduct a magnetic valve test;
  supplying the supply voltage to the magnetic valve via a controllable switch;
  opening the controllable switch by a magnetic valve test signal generated by the instrumentation and control device in order to start the magnetic valve test; and
  supplying the magnetic valve test signal to the controllable switch via a limit switch controlled by the actuating element,
  wherein the limit switch is opened when the actuating element reaches a predefined position.

2. The method as claimed in claim 1, wherein the magnetic valve test signal is generated for a sufficiently long time for the actuating element to oscillate multiple times about the predefined position.

3. The method as claimed in claim 2, further comprising:
  recording and storing a path change executed in the process by the actuating element during the magnetic valve test.

4. The method as claimed in claim 3, further comprising:
  transmitting the path change of the actuating element by the position controller to the instrumentation and control device; and
  storing the path change of the actuating element in the instrumentation and control device.

5. The method as claimed in claim 2, further comprising:
  storing and evaluating a duty cycle of the magnetic valve test signal supplied to the controllable switch downstream of the limit switch in order to determine the technical condition of the final control device.

6. The method as claimed in claim 1, further comprising:
  recording and storing a path change executed in the process by the actuating element during the magnetic valve test.

7. The method as claimed in claim 6, further comprising:
  transmitting the path change of the actuating element by the position controller to the instrumentation and control device; and
  storing the path change of the actuating element in the instrumentation and control device.

8. The method as claimed in claim 7, further comprising:
  storing and evaluating a duty cycle of the magnetic valve test signal supplied to the controllable switch downstream of the limit switch in order to determine the technical condition of the final control device.

9. The method as claimed in claim 6, further comprising:
  storing and evaluating a duty cycle of the magnetic valve test signal supplied to the controllable switch downstream of the limit switch in order to determine the technical condition of the final control device.

10. The method as claimed in claim 1, further comprising:
  storing and evaluating a duty cycle of the magnetic valve test signal supplied to the controllable switch downstream of the limit switch in order to determine the technical condition of the final control device.

* * * * *